Oct. 8, 1946.　　　　　B. CONES　　　　2,408,915

PISTON

Original Filed June 24, 1943

Inventor
Ben Cones
By Randolph & Beavers
Attorneys

Patented Oct. 8, 1946

2,408,915

UNITED STATES PATENT OFFICE 2,408,915

PISTON

Ben Cones, Indianapolis, Ind.

Original application June 24, 1943, Serial No. 492,099. Divided and this application February 2, 1945, Serial No. 575,838

1 Claim. (Cl. 309—4)

This invention relates to air motors and more particularly to a piston construction, the subject matter being a division of copending application Serial No. 492,099, filed June 24, 1943, and patented under Patent No. 2,379,683, issued July 3, 1945.

An important object of the invention is to provide a special piston construction provided with a sealing factor capable of offering considerably more sealing effect than is possible with most known structures of this character.

Other objects and advantages of the invention shall become apparent to the reader of the following description.

In the drawing—

Figure 1:
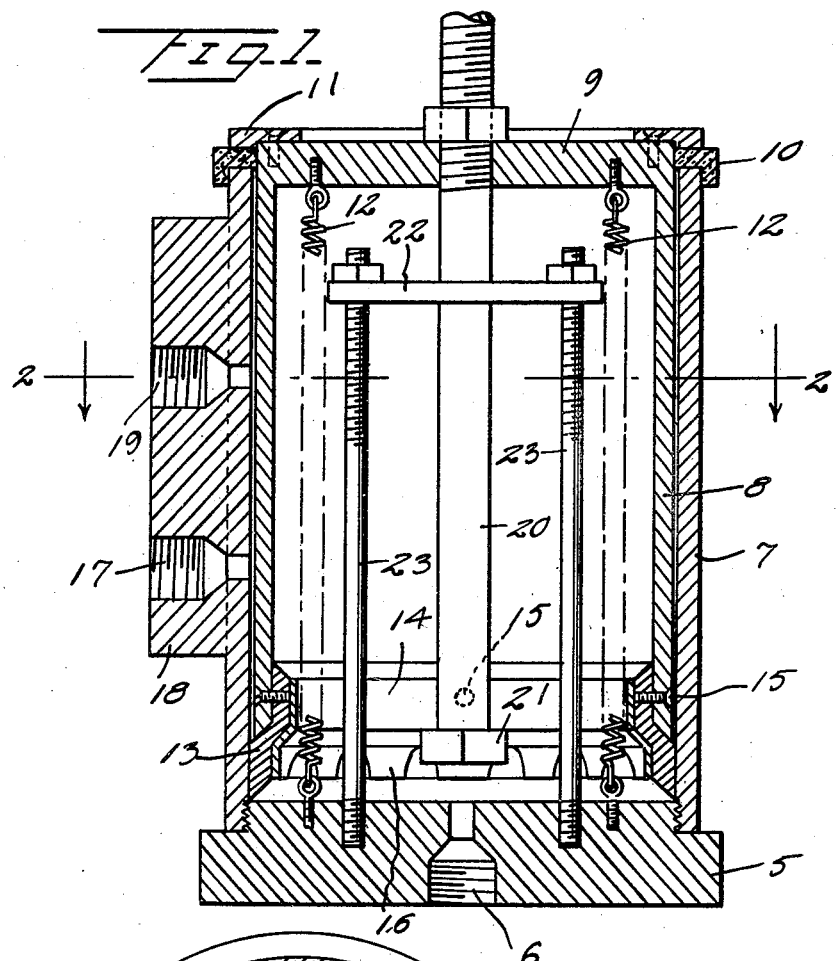
Figure 1 is a fragmentary vertical sectional view.
Figure 2:
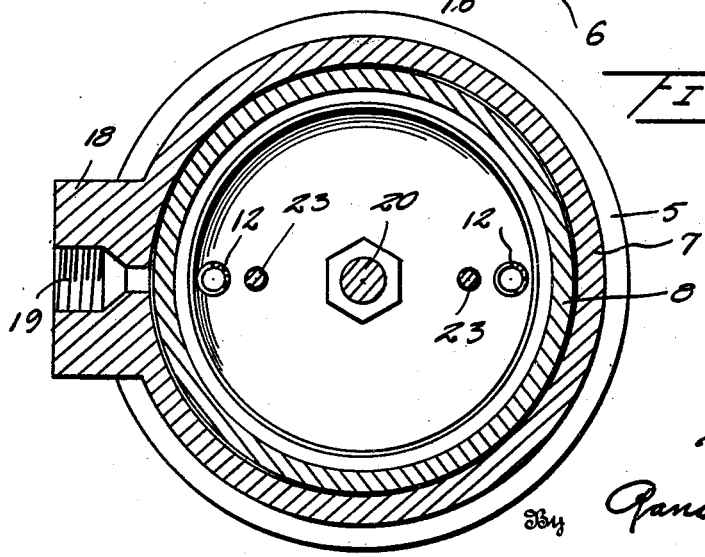
Figure 2 is a horizontal section taken on line 2—2 of Figure 1.

Referring now to the drawing in detail wherein for the purposes of illustration I have disclosed a preferred embodiment of my invention, the numeral 5 designates a base having a threaded tap 6 adapted for attaching an air line thereto. An outer cylinder 7 rises from the base which is open at its top and in which an inner cylinder 8 or piston is arranged for working movement. The inner cylinder is open at its bottom and closed at its top as shown at 9. A felt packing ring 10 is positioned on the upper edge of the outer cylinder 7 and a ring 11 is secured to the top 9 and projects beyond the walls of the inner cylinder to strike the felt ring 10.

A pair of coil springs 12 connects the base 5 with the top 9 to retract the inner cylinder.

A flexible sealing ring 13 is secured to the inner wall of the inner cylinder adjacent its lower edge by rivets 15 and projects below the lower edge of the inner cylinder. The ring 13 may be constructed of any suitable material which is impervious to moisture and oil and heat resistant. An expansible spring steel ring 14 is positioned within the sealing ring and is flared at its lower edge and scalloped to produce fingers 16 adapted to expand under the influence of air pressure entering the cylinder to compress the sealing ring 13 against the inner walls of the outer cylinder.

A lower threaded tap 17 is formed in a block 18 secured to the outer wall of the outer cylinder and which communicates with the interior thereof for attaching an exhaust pipe and a second threaded tap 19 is also formed in the block and likewise communicates with the outer cylinder above the tap 17.

A connecting rod 20 is threaded into the top 9 and extends through the top 9 into the inner cylinder with a nut 21 on its inner end adapted to engage a cross bar 22 secured on the upper ends of studs 23 rising from the base 5 to limit outward movement of the inner cylinder. The rod 20 may be connected to a lever, valve, damper or other mechanism to be operated by the air motor.

The air outlets 17 and 19 may be connected to auxiliary motors or valves (not shown) to utilize the exhausted air for operating the same.

The several elements forming the invention may be assembled in any practicable manner, as for instance, first attaching the studs 23 and cross-bar 22 to the base 5, then inserting the rod 20 through the top 9 of the piston 8 and downwardly through the cross-bar 22 and the nut 21 may then be attached to the lower end of the rod 20 while the piston is held upwardly away from the base. The upper ends of the springs 12 are attached to the underside of the top 9 of the piston 8 before the piston is placed over the studs 23, and after the rod 20 has been secured in position, the piston may be held upwardly above the base a sufficient distance to prevent a person's hand to grasp the lower edge of the spring and pull the same downwardly for hooking the lower ends of the springs in the screw-eyes carried by the base.

The cylinder 7 is then placed over the piston and threaded on the base, after which the ring 11 is secured on top of the piston.

It is believed the details of construction, operation and manner of use of the device will be readily understood from the foregoing without further detailed explanation.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a piston construction including a skirt portion adapted for working in a cylinder, a sealing ring secured to the inner lower edge of the skirt of the piston and projecting below the lower edge of the piston, a clamping ring positioned within the sealing ring, and spring fingers on the lower edge of the clamping ring and responsive to internal pressure in the piston to expand the lower edge of the sealing ring against the wall of the cylinder.

BEN CONES.